Aug. 26, 1947.　　　E. E. REINSCH　　　2,426,566
LIVE CENTER TOOL
Filed April 19, 1945
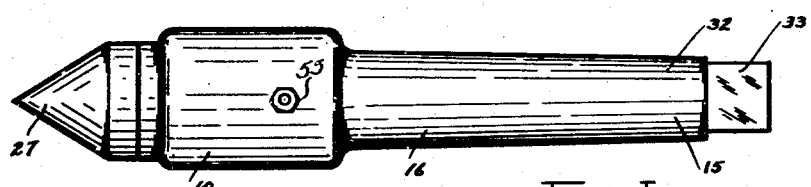
Fig. I.
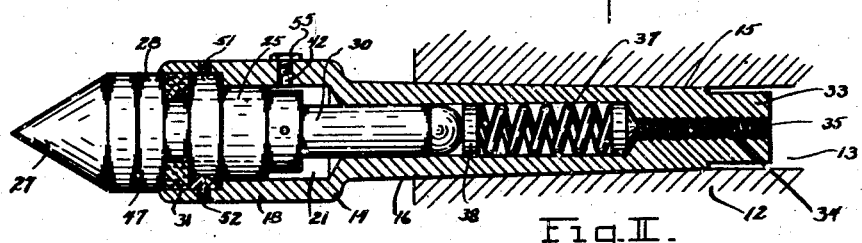
Fig. II.
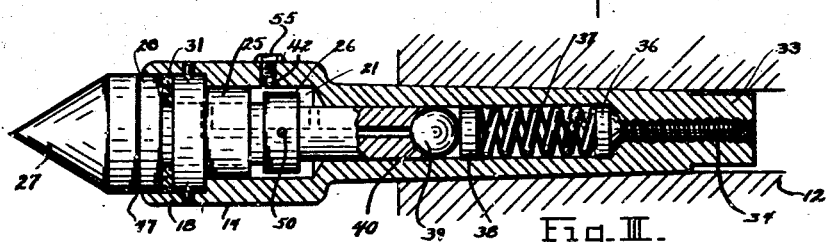
Fig. III.
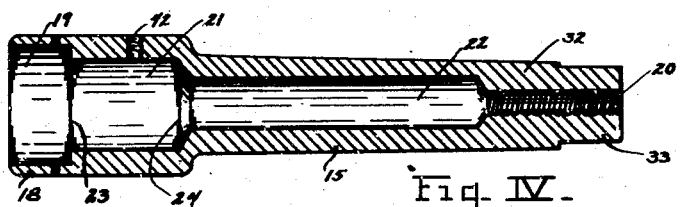
Fig. IV.
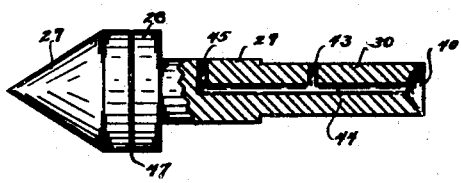
Fig. V.
Fig. VI.
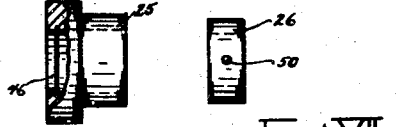
Fig. VII.
INVENTOR.
*ERICH E. REINSCH.*
BY
*Joseph B. Lindecker*
ATT'Y.

Patented Aug. 26, 1947

2,426,566

UNITED STATES PATENT OFFICE 2,426,566

LIVE CENTER TOOL

Erich E. Reinsch, Chicago, Ill.

Application April 19, 1945, Serial No. 589,196

2 Claims. (Cl. 82—33)

The object of this invention is to provide a new and improved lathe center with which extreme precision may be secured with a high degree of uniformity that will hold the work firmly and accurately in place during all conditions and during all changes of temperature of the stock being operated on.

A further object of this invention is to provide a new lathe center having a work receiving center which rotates with the stock being worked upon and an automatic adjustment and take-up on the pivot bearing incorporated within so that the center will rotate accurately and without chatter at all times.

A still further object of this invention is to provide a revolving lathe center which is constructed in such a manner that a lubricant, such as oil, is carried without the possibility of leakage.

Another object of this invention is to provide a live center tool for a lathe, said center tool having a tapered shank portion at the rear end thereof, and adapted to be positioned in the tail stock spindle of said lathe, said tool having an enlarged portion or housing at its forward end, said tool having a spring pressed center pin which projects beyond said housing and fitted therein to extend rearwardly into a bore within said shank, the rear end of said center pin provided with a socket to retain a ball-bearing type of thrust bearing which is further retained in the bore of said shank and which is also in contact with a steel washer or flat surface member in said bore, said bore also having a compression spring therein for pressing said washer into contact with said ball-bearing and further for pressing said movable pin outwardly, said tool having means for holding said pin against the outward pressure of said spring, however, permitting said movable center point to recede within the housing against the pressure applied to the rear end thereof, said shank having means for varying the tension upon said spring to compensate for any shortening in the length thereof incident to replacing parts or regrinding said center point.

Other objects and advantages will appear in the following specification, and the novel features of the invention will be particularly pointed out in the appended claims.

The invention is illustrated in the accompanying drawings, forming part of this application, in which:

Figure I is a longitudinal view of a preferred embodiment of this invention.

Figure II is a sectional view of the same.

Figure III is a sectional view of the same with the center point pressed rearwardly within the outer housing.

Figure IV is a sectional view of the stationary housing and shank portion of the lathe center.

Figure V is a longitudinal view of the center point and shaft, with the rear portion broken away and shown in cross section.

Figure VI is a view, partly in section and partly in elevation, showing a bearing with an oil retaining groove.

Figure VII is a view in elevation showing the lock collar adapted to fit on the rear shaft portion of the live center.

In the drawing reference numeral 10 designates a tapered lathe center which is adapted to fit into the tail stock of a lathe in the usual manner.

In Figures II and III the tail stock spindle or ram thereof, as the case may be, is illustrated generally at 12 and has the usual recess 13 therein to receive the center point construction. The lathe center is made up of a body or socket 14 having a shank 15 whose periphery is provided with a taper so as to provide a fit with the recess 13. The head end portion 18 forms a part of the body 14 and is considerably enlarged as best seen in Figures II and III.

The body 14 is hollowed out to provide a bore 19 in the forward end of head 18, and bore 21 in the central and rear end thereof. The shank 15 is provided with a bore 22 in the forward and central portion thereof, and with a threaded hole 20, in the rear end thereof.

A shoulder 23 is arranged in the rear end of bore 19 adjacent to bore 21, and a shoulder 24 is arranged in the bore 21 adjacent to bore 22. The rear portion of bore 19 and the forward end portion of bore 21 is shaped to receive the hollow collar type bearing 25, while the bore 21 is arranged to receive the cylindrical lock collar 26 positioned upon the rear cylindrical portion 30 of center 27. The forward end of bore 19 is arranged to receive the enlarged head portion 28 of the center 27, the left washer 31, and the enlarged portion of collar 25, while the bore 22 is adapted to receive the cylindrical portion 30 of said center 27 which is directly behind the central portion 29 thereof, said portion 29 is adapted to receive the collar 25, while said portion 30 is adapted to receive the collar 26.

The tail portion 32 of the shank 15 is reduced as at 33 and is drilled or hollowed out to form the bore 20, said bore being tapped or threaded, to receive adjusting plug 34 threaded into the rear end thereof. The plug 34 is provided with a key seat 35 to receive a tool for adjusting said plug to crowd or release a washer 36 against the rear end of a spring 37 which is positioned in bore 22. Said spring 37 regulates the tension thereof against washer 38 which is in contact with thrust ball-bearing 39 positioned in bore 22 and in socket 40 formed in the rear end of the portion 30 of center 27.

The ball-bearing 39 is in the bore 22 between socket 40 and the flat washer 38 and is in combination with the spring 37 to absorb the thrust sufficient to support the load of the work, and align the center point with the work, preventing wiggle therein. The center 27 maintains alignment and is capable of running in a bath of oil, since oil is fed through oil hole 42 into bore 21 which is provided with closure plug 55. The oil travels through a vertical passageway 43 to a horizontal oil passageway 44 and then in each direction therethrough, forwardly to a vertical passageway 45 where the oil contacts the interior of bearing 25, said bearing having an oil groove 46 as shown in Figure VI. The oil is sealed in bore 19 by closure plug 55 and felt washer 31. When the oil travels rearwardly in passage 44 it contacts the bearing 39 in socket 40. The center 27 has a mark or groove 47 on its surface, said mark to guide the operator as to the movement of said center pin.

As the stock being worked upon becomes warm and expands longitudinally, it presses upon the center point 27 and forces the shaft 30 rearwardly, compressing the spring 37, as well as compressing the felt washer 31 in bore 19. The lock collar 26 travels along with shaft 30 since it is held in place by set screw 50. Bearing 25 is held in place by set screws 51 and 52, and by this arrangement bearing 25 and collar 26 become separated as clearly shown in Figure III.

The socket 40 and bearing 39 may be arranged so that the ball may rotate in the socket, however, it is more often desired that the ball may be non-rotatably carried in the socket. By the latter arrangement the center 27, with parts 29 and 30 thereof, and the ball 39, will rotate freely, said ball providing a point contact bearing with the washer 38 thereby reducing the friction to a minimum. It will be seen with this construction as described above, all the friction encountered by a plurality of balls and races, or roller bearings and races, is completely eliminated. By means of adjusting screw 34 any wear of the revolving center, or of the ball thrust bearing, or change in spring tension, can be taken up, thus a minimum amount of clearance can be maintained between the revolving center and associated parts which obviates any looseness or chattering of work while being machined. Should a new bearing become necessary, it is a simple matter to replace it, the set screws 51 and 52 are released and the center point 27 with bearing 25 and collar 26 are removed, allowing ball 39 to run forwardly and out the open end of housing 18. Plug 34 and washers 36 and 38 as well as spring 37 may be removed in the same manner as described above.

To utilize cemented-carbide tools today and with the high speeds of work revolution, the fixed type of loose head center would be rapidly destroyed, so that a live center must be fitted to revolve with the work. The type with a taper shank as shown in this application is generally employed. Complicated types have been made but are soon found defective. This simple, single bearing, spring held type is deemed novel and will prove to be very efficient.

By careful workmanship, this single ball-bearing and spring mounted lathe center can be made absolutely true, and there being no wear on the point of said center, it will remain true, and with the running parts being enclosed in oil, said lathe center should give long service.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. In a compensating center, the combination of a stationary support, a chamber formed in the forward end thereof, an axial bore formed in the central portion thereof, a live center pin located in said chamber and extending into said bore, a stationary bearing in said chamber supporting said pin, a lock collar located on said pin, a ball-bearing located at the end of said pin, a bearing plate in contact with said ball-bearing, a spring located in said bore and in pressing contact with said plate, and means for lubricating the stationary bearing and all moving parts.

2. In a compensating center, the combination of a stationary support, a chamber formed in the forward end thereof, an axial bore formed in the central portion thereof, a live center pin located in said chamber and extending into said bore, a stationary bearing in said chamber supporting said pin, a lock collar located on said pin, a ball-bearing located at the end of said pin, a bearing plate in contact with said ball-bearing, a compression spring located in said bore for pressing said plate into contact with said ball-bearing and further for pressing said center pin outwardly, means for holding said pin against the outward pressure of said spring but permitting said movable pin to recede within the chamber, against the pressure applied to the rear end thereof, lubricating oil located within said chamber and oil passageways connecting said chamber with all moving parts.

ERICH E. REINSCH.

REFERENCES CITED

The following references are of record in the file of this patent:

UNITED STATES PATENTS

| Number | Name | Date |
|---|---|---|
| 979,034 | Rowe | Dec. 20, 1910 |
| 1,747,385 | Olson | Feb. 18, 1930 |
| 1,993,809 | Schnelle | Mar. 12, 1935 |
| 2,056,586 | Rohm | Oct. 6, 1936 |
| 2,140,565 | Svenson | Dec. 20, 1938 |